United States Patent
Bittar et al.

(10) Patent No.: US 8,866,483 B2
(45) Date of Patent: Oct. 21, 2014

(54) METHOD AND APPARATUS WITH HIGH RESOLUTION ELECTRODE CONFIGURATION FOR IMAGING IN OIL-BASED MUDS

(75) Inventors: Michael Bittar, Houston, TX (US); Guoyu Hu, Houston, TX (US); Glenn Smollinger, Eagleville, PA (US)

(73) Assignee: Halliburton Energy Services, Inc., Houston, TX (US)

( * ) Notice: Subject to any disclaimer, the term of this patent is extended or adjusted under 35 U.S.C. 154(b) by 667 days.

(21) Appl. No.: 12/680,868

(22) PCT Filed: Apr. 8, 2008

(86) PCT No.: PCT/US2008/059655
§ 371 (c)(1),
(2), (4) Date: May 6, 2011

(87) PCT Pub. No.: WO2009/126150
PCT Pub. Date: Oct. 15, 2009

(65) Prior Publication Data
US 2011/0204897 A1    Aug. 25, 2011

(51) Int. Cl.
*G01V 3/00* (2006.01)
*G01V 3/24* (2006.01)

(52) U.S. Cl.
CPC .................................... *G01V 3/24* (2013.01)
USPC .......................................... 324/374; 324/367

(58) Field of Classification Search
USPC .......................................... 324/351, 367, 374
See application file for complete search history.

(56) References Cited

U.S. PATENT DOCUMENTS 3,772,513 A    11/1973 Hall, Jr. et al.
4,424,444 A    1/1984 Smith, Jr. et al.

(Continued)

FOREIGN PATENT DOCUMENTS

AU    2008/354330    5/2012
GB    2468178    6/2012

(Continued)

OTHER PUBLICATIONS

Elliott, Paul "Oil-Based Mud Imaging Tool Meets Challenges Posed by Thin Beds, Low Resistive Formations, and Shales", Fuel from Knowledge Central—Copyright 2008 Halliburton Company (Jan. 2007), pp. 1-4.

(Continued)

*Primary Examiner* — Reena Aurora
(74) *Attorney, Agent, or Firm* — Krueger Iselin LLP; Benjamin Fite

(57) ABSTRACT

Various disclosed resistivity imaging tools and methods provide a high-resolution electrode configuration for imaging in oil-based imaging in oil-based muds. Some tool embodiments have a sensing surface that comprises: a measurement electrode, a focus electrode surrounding the measurement electrode, and a return electrode surrounding the focus electrode. The sensing surface can be provided on an extendable sensor pad or on the wall-contacting portion of a stabilizer. Some method embodiments include measuring the measurement electrode current while driving a voltage signal between the measurement electrode and the return electrode. The voltage signal may simultaneously or sequentially provide energy at different frequencies. The resistivity measurements are combined with tool position and orientation measurements to form a borehole wall image. Robust and reliable performance is expected in the hostile conditions often experienced by logging while drilling (LWD) tools, coupled with the ability to make micro-resistivity measurements with a resolution approaching that of electrode-grid tool designs.

23 Claims, 5 Drawing Sheets

(56) References Cited

U.S. PATENT DOCUMENTS

| | | | |
|---|---|---|---|
| 5,668,369 | A | 9/1997 | Oraby |
| 6,600,321 | B2 | 7/2003 | Evans |
| 7,250,768 | B2 * | 7/2007 | Ritter et al. .................. 324/369 |
| 7,420,373 | B2 | 9/2008 | Reiderman et al. |
| 2005/0067190 | A1 | 3/2005 | Tabanou et al. |
| 2006/0214664 | A1 | 9/2006 | Folberth et al. |
| 2007/0007967 | A1 | 1/2007 | Itskovich et al. |
| 2007/0046290 | A1 | 3/2007 | Bespalov et al. |
| 2008/0068024 | A1 | 3/2008 | Gold et al. |
| 2008/0179510 | A1 | 7/2008 | Jacobi |

FOREIGN PATENT DOCUMENTS

| | | |
|---|---|---|
| WO | WO 2007/143039 | 12/2007 |
| WO | WO-2009/126150 | 10/2009 |

OTHER PUBLICATIONS

Chinese Office Action, dated Dec. 7, 2011, Appl No. 200880022184.4, "Method and Apparatus with High Resolution Electrode Configuration for Imaging in Oil-Based Muds", filed Apr. 8, 2008, 10 pgs.

Chinese Office Action, dated Aug. 9, 2012, Appl No. 200880022184.4, "Method and Apparatus with High Resolution Electrode Configuration for Imaging in Oil-Based Muds", filed Apr. 8, 2008, 10 pgs.

Malaysian Examination Report, dated Nov. 15, 2011, Appl No. PI 20095447, "Method and Apparatus with High Resolution Electrode Configuration for Imaging in Oil-Based Muds" filed Dec. 17, 2009, 3 pgs.

Third Chinese Office Action, dated Apr. 15, 2013, Appl No. 200880022184.4, "Method and Apparatus with High Resolution Electrode Configuration for Imaging in Oil-Based Muds", filed Apr. 8, 2008, 26 pgs.

* cited by examiner

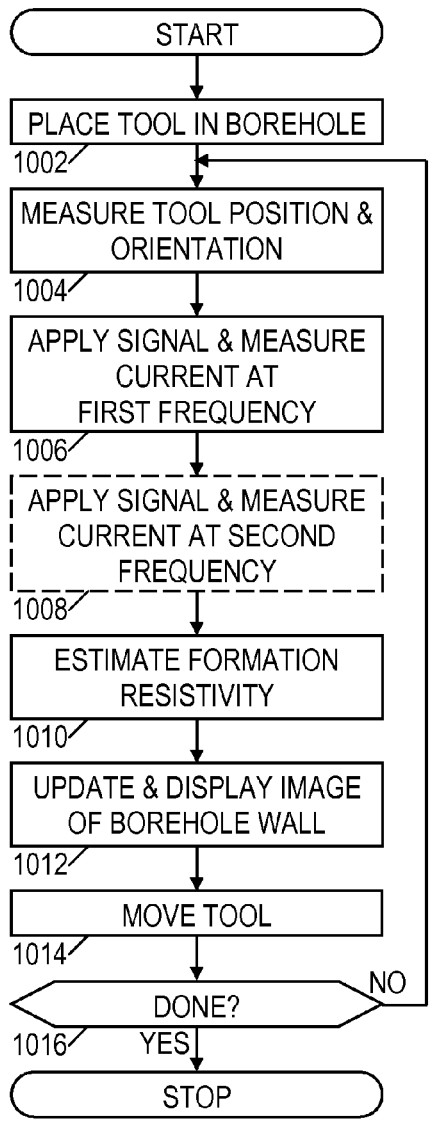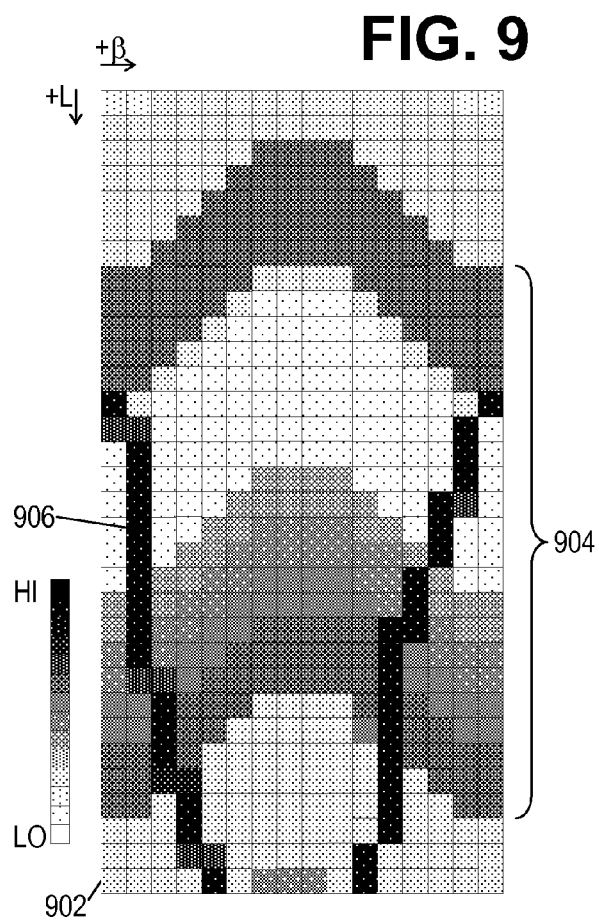
FIG. 11
FIG. 9

METHOD AND APPARATUS WITH HIGH RESOLUTION ELECTRODE CONFIGURATION FOR IMAGING IN OIL-BASED MUDS

CROSS REFERENCE TO RELATED APPLICATIONS

The present application is a U.S. national phase filing claiming priority to PCT Application No. PCT/US2008/059655 titled "Methods and Apparatus with High Resolution Electrode Configuration for Imaging in Oil-Based Muds", which was filed Apr. 8, 2008 and is hereby incorporated herein by reference.

BACKGROUND

Modern oil field operations demand a great quantity of information relating to the parameters and conditions encountered downhole. Such information typically includes characteristics of the earth formations traversed by the borehole, and data relating to the size and configuration of the borehole itself. The collection of information relating to conditions downhole, which commonly is referred to as "logging," can be performed by several methods including wireline logging and "logging while drilling" (LWD).

In wireline logging, a probe or "sonde" is lowered into the borehole after some or the entire well has been drilled. The sonde hangs at the end of a long cable or "wireline" that provides mechanical support to the sonde and also provides an electrical connection between the sonde and electrical equipment located at the surface of the well. In accordance with existing logging techniques, various parameters of the earth's formations are measured and correlated with the position of the sonde in the borehole as the sonde is pulled uphole.

In LWD, the drilling assembly includes sensing instruments that measure various parameters as the formation is being penetrated. While LWD techniques allow more contemporaneous formation measurements, drilling operations create an environment that is generally hostile to electronic instrumentation and sensor operations.

In these and other logging environments, it is desirable to construct an image of the borehole wall. Among other things, such images reveal the fine-scale structure of the penetrated formations. The fine-scale structure includes stratifications such as shale/sand sequences, fractures, and non-homogeneities caused by irregular cementation and variations in pore size. Orientations of fractures and strata can also be identified, enabling more accurate reservoir flow modeling.

Borehole wall imaging can be accomplished in a number of ways, but micro-resistivity tools have proven to be effective for this purpose. Micro-resistivity tools measure borehole surface resistivity on a fine scale. The resistivity measurements can be converted into pixel intensity values to obtain a borehole wall image. Such tools were originally developed for use in conductive borehole fluids (such as water-based drilling mud). However, resistive borehole fluids such as oil-based muds inhibit such measurements due to the variability of impedance in the mud surrounding the tool. Nevertheless, a number of micro-resistivity tools for use in oil-based muds have been proposed, including those disclosed in U.S. Pat. No. 6,191,588 (Chen), U.S. Pat. No. 6,600,321 (Evans), and U.S. Pat. No. 7,098,664 (Bittar). Though each of these designs may offer some benefits, the search continues for ever-more advantageous tool configurations.

BRIEF DESCRIPTION OF THE DRAWINGS

In the following detailed description, reference will be made to the accompanying drawings, in which:

FIG. 9 shows an illustrative resistivity image;
FIG. 11 is a flow diagram of an illustrative imaging method.

The drawings show illustrative invention embodiments that will be described in detail. However, the description and accompanying drawings are not intended to limit the invention to the illustrative embodiments, but to the contrary, the intention is to disclose and protect all modifications, equivalents, and alternatives falling within the spirit and scope of the appended claims.

NOMENCLATURE

Certain terms are used throughout the following description and claims to refer to particular system components. This document does not intend to distinguish between components that differ in name but not function. The terms "including" and "comprising" are used in an open-ended fashion, and thus should be interpreted to mean "including, but not limited to . . . ". The term "couple" or "couples" is intended to mean either an indirect or direct electrical, mechanical, or thermal connection. Thus, if a first device couples to a second device, that connection may be through a direct connection, or through an indirect connection via other devices and connections. Conversely, the term "connected" when unqualified should be interpreted to mean a direct connection. For an electrical connection, this term means that two elements are attached via an electrical path having essentially zero impedance.

DETAILED DESCRIPTION

Disclosed herein are various resistivity imaging tools and methods having a high-resolution electrode configuration for imaging in oil-based muds. The disclosed configuration promises robust and reliable performance in the hostile conditions often experience by logging while drilling (LWD) tools, coupled with the ability to make micro-resistivity measurements with a resolution approaching that of the electrode-grid tool designs. In some embodiments, a sensing face includes a central measurement electrode surrounded by a focus electrode having a dimension at least four times larger than the central electrode, but no more than about twenty times larger. Immediately surrounding the focus electrode in the sensing face is a return electrode that defines the limits of the measurement field. This sensing face can be provided on an extendable sensor pad, but it is expected to be more robust when embedded on the outer surface of a stabilizer.

Figures 1, 2:
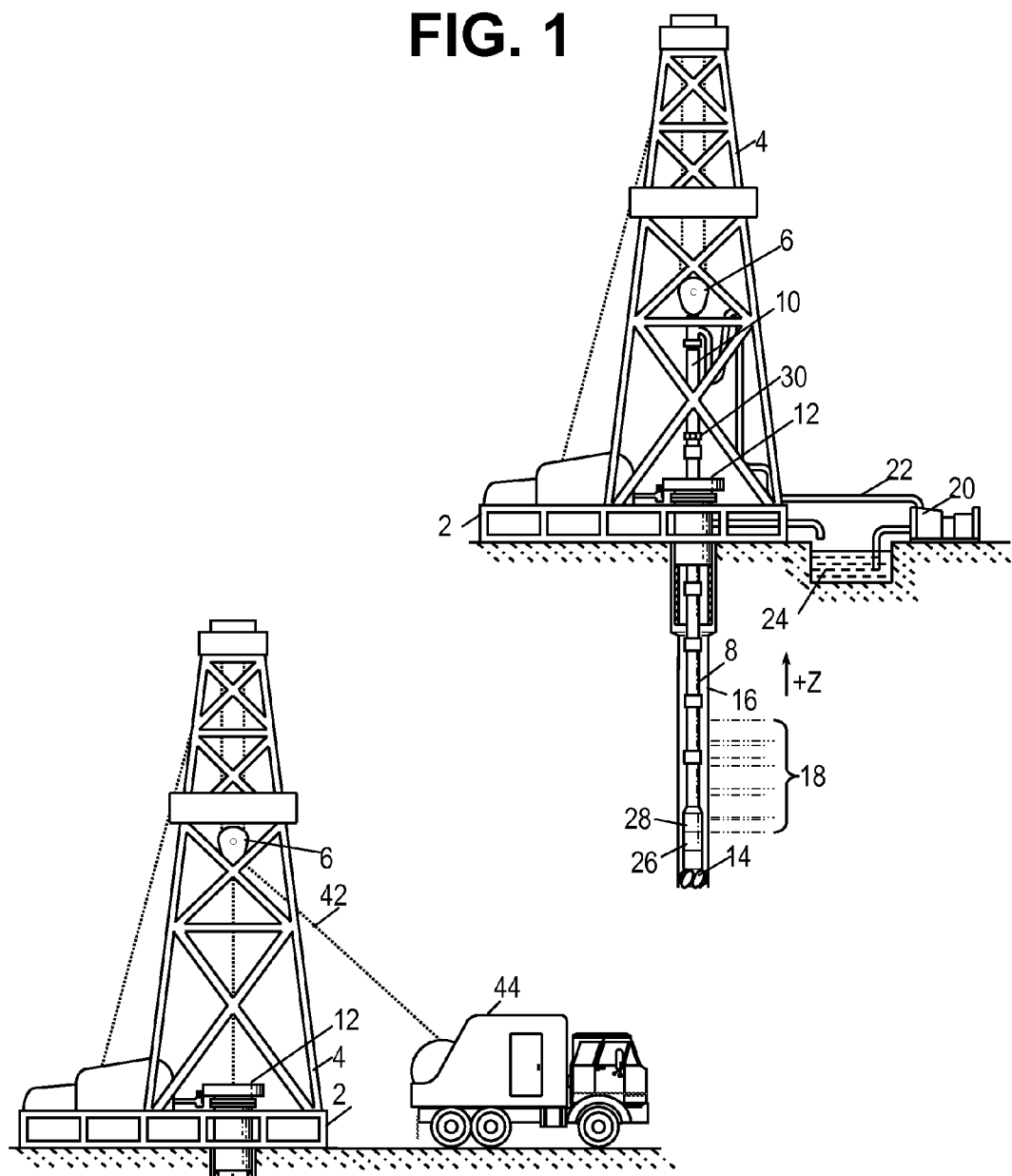
FIG. 1 shows an illustrative logging while drilling (LWD) environment.
FIG. 2 shows an illustrative wireline logging environment.

The disclosed tools and methods are best understood in the context of the larger systems in which they operate. Accordingly, FIG. 1 shows an illustrative logging while drilling (LWD) environment. A drilling platform 2 supports a derrick 4 having a traveling block 6 for raising and lowering a drill string 8. A drill string kelly 10 supports the rest of the drill string 8 as it is lowered through a rotary table 12. The rotary table 12 rotates the drill string, thereby turning a drill bit 14. As bit 14 rotates, it creates a borehole 16 that passes through various formations 18. A pump 20 circulates drilling fluid through a feed pipe 22 to kelly 10, downhole through the interior of drill string 8, through orifices in drill bit 14, back to the surface via the annulus around drill string 8, and into a retention pit 24. The drilling fluid transports cuttings from the borehole into the pit 24 and aids in maintaining the borehole integrity.

The drill bit 14 is just one piece of a bottom-hole assembly that includes one or more drill collars (thick-walled steel pipe) to provide weight and rigidity to aid the drilling process. Some of these drill collars include built-in logging instruments to gather measurements of various drilling parameters such as position, orientation, weight-on-bit, borehole diameter, etc. The tool orientation may be specified in terms of a tool face angle (rotational orientation), an inclination angle (the slope), and compass direction, each of which can be derived from measurements by magnetometers, inclinometers, and/or accelerometers, though other sensor types such as gyroscopes may alternatively be used. In one specific embodiment, the tool includes a 3-axis fluxgate magnetometer and a 3-axis accelerometer. As is known in the art, the combination of those two sensor systems enables the measurement of the tool face angle, inclination angle, and compass direction. Such orientation measurements can be combined with gyroscopic or inertial measurements to accurately track tool position.

A LWD resistivity imaging tool 26 may integrated into the bottom-hole assembly near the bit 14. As the bit extends the borehole through the formations, tool 26 rotates and collects micro-resistivity measurements that a downhole controller associates with tool position and orientation measurements to form a resistivity image map of the borehole wall. The measurements can be stored in internal memory and/or communicated to the surface. A telemetry sub 28 may be included in the bottom-hole assembly to maintain a communications link with the surface. Mud pulse telemetry is one common telemetry technique for transferring tool measurements to a surface receiver 30 and receiving commands from the surface, but other telemetry techniques can also be used.

At various times during the drilling process, the drill string 8 may be removed from the borehole as shown in FIG. 2. Once the drill string has been removed, logging operations can be conducted using a wireline logging tool 34, i.e., a sensing instrument sonde suspended by a cable 42 having conductors for transporting power to the tool and telemetry from the tool to the surface. A resistivity imaging portion of the logging tool 34 may have sensing pads 36 that slide along the borehole wall as the tool is pulled uphole. A logging facility 44 collects measurements from the logging tool 34, and includes computing facilities for processing and storing the measurements gathered by the logging tool.

In the logging scenarios described above with respect to FIGS. 1 and 2, the drilling fluid present in the borehole is an electrically nonconductive fluid such as an oil-based mud. Some of the fluid may mix with drill cuttings or material from the borehole walls to form a viscous semi-solid layer on the borehole walls. This layer is commonly termed "mudcake", and it prevents intimate contact between logging sensors and uncontaminated formation material. In addition, motion of the logging instruments may create a fluid flow layer that further separates the logging sensors from the uncontaminated formation materials.

The mudcake and fluid flow layers have a very low conductivity, which creates some difficulty for high-resolution measurements of borehole wall resistivity. The mudcake creates additional problems where low resistivity formations are measured, because the current flow into the formation may be relatively small and consequently it generates an extremely small voltage difference that is difficult to measure. Measurements of high-conductivity formations through the low-conductivity layers may be improved by: (1) using an alternating current; (2) increasing electrode size (at the cost of degrading spatial resolution); and (3) using a power source with a higher operating frequency.

Figure 3:
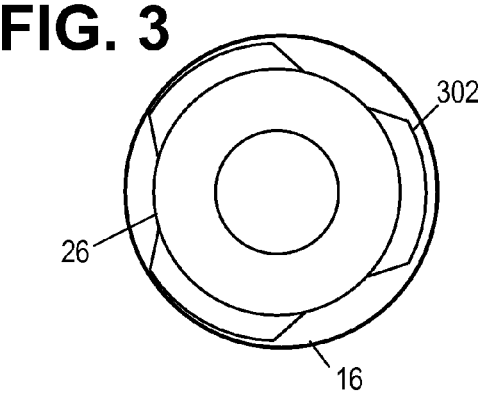
FIG. 3 is a cross-section of an illustrative logging tool.

FIG. 3 shows a cross-sectional view of an illustrative LWD resistivity imaging tool 26 in a borehole 16. Three stabilizers 302 maintain the tool near the center of the borehole and, in so doing, minimize the standoff between the external faces of the stabilizers and the borehole wall. It is desirable to minimize the thickness of the insulating fluid layer between the sensing surface and the portions of the wall being measured. Other mechanisms can be employed to minimize standoff, such as pads mounted on extendable arms or biasing springs. Alternatively, such arms or springs may be used to force the tool body itself against the borehole wall. Though suitable for this application, such mechanisms may not be as robust as a sensing surface embedded in a stabilizer.

As the tool 26 rotates and progresses downhole at the drilling rate, each sensing surface will trace a helical path on the borehole wall. Orientation sensors within the tool can be used to associate the resistivity measurements with the sensors' positions on the borehole wall. Surface computing facilities collect resistivity measurements, orientation (azimuth) measurements, and tool position measurements, and process the collected measurements to create a resistivity image of the borehole wall.

Figure 4:
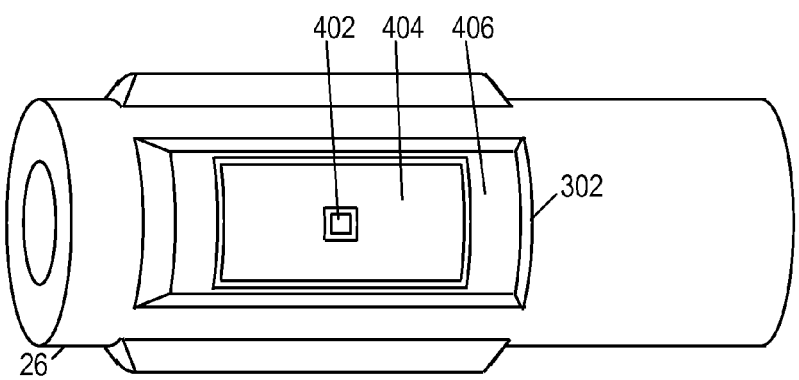
FIG. 4 is a perspective view of an illustrative logging tool.

FIG. 4 shows a perspective view of illustrative resistivity imaging tool 26. Tool 26 is a drill collar (a thick-walled steel tubular) having two or more equally-spaced stabilizer protrusions that act to minimize the standoff between the tool's sensing surface(s) and the borehole wall. As shown in FIG. 4, the sensing surface includes a central measurement electrode 402 surrounded by a focus electrode 404, which in turn is surrounded by a return electrode 406. As shown, the sensing surface is positioned on the wall-contacting surface of stabilizer 302. Due to tool rotation at a rate much greater than the drill bit's rate of penetration, it is expected that one sensing surface is sufficient for resistivity imaging. However, additional sensing surfaces may be provided on the other stabilizers if desired for redundancy, compensation, and/or noise reduction. Such additional sensing surfaces enable the tool to function normally even if one of the surfaces is damaged. Moreover, the measurements from such additional surfaces enable the use of signal processing techniques that compensate for noise and individual variation of the sensing surfaces' performance characteristics.

In the illustrative implementation, the measurement electrode is a square about one inch (2.5 cm) across. The width of the insulating gaps on the sensor face is no more than 0.2 inches (0.5 cm). The focus electrode is rectangular, with a width of about six inches (about 15.2 cm) and a height of about twelve inches (about 30.5 cm). The focus electrode is maintained at essentially the same potential as the measurement electrode to direct the measurement currents deeper into the formation. The main body of the tool serves as the return electrode, but a return electrode need not be any larger (in terms of surface area) than the focus electrode. Thus, for example, a rectangularly-shaped annular electrode having dimensions of about 10×16 inches (25.4×40.6 cm) would be sufficient for the illustrated tool. The tool is not limited to having square or rectangular electrodes. Circular or elliptical electrodes would also be suitable. Moreover, the dimensions can also be adjusted to balance measurement resolution with tolerance for larger standoffs.

FIG. 4 shows the return electrode completely surrounding the focus electrode. However, it is possible to achieve similar measurement quality with gaps in the return electrode, so long as the return electrode substantially surrounds the focus electrode. In this context the term "substantially" means that each gap occupies less than 30 degrees of arc as measured from the center of the measurement electrode. Similarly, the focus electrode need only substantially surround the measurement electrode.

Figure 5A:
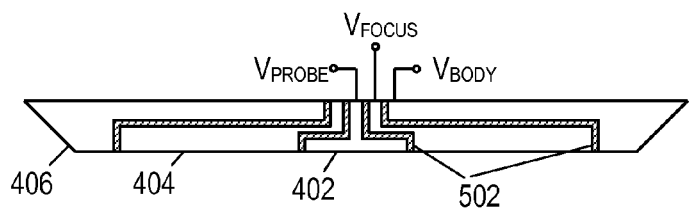
FIG. 5A is a cross-section of an illustrative stabilizer or sensor pad.

FIG. 5A shows a cross-section of the stabilizer protrusion 302, showing layers of insulating material 502 separating the measurement electrode 402 from the focus electrode 404, and separating the focus electrode 404 from the return electrode 406. In some embodiments, the electrodes are made out of steel, though other conductive materials can be used so long as they are rugged enough to withstand the rigors of the drilling environment. In the illustrative embodiments, a polyetheretherketone (PEEK) material is used to form the insulating layers, but other insulating materials can also be used. Because the focus electrode is maintained at essentially the same potential as the measurement electrode, the thickness of the insulating layers can be minimized without undue concern for capacitive coupling between the measurement electrode and the return electrode. A cavity may be positioned in the wall of the drill collar underneath the stabilizer protrusion to hold sensor circuitry (described further below).

Figure 5B:
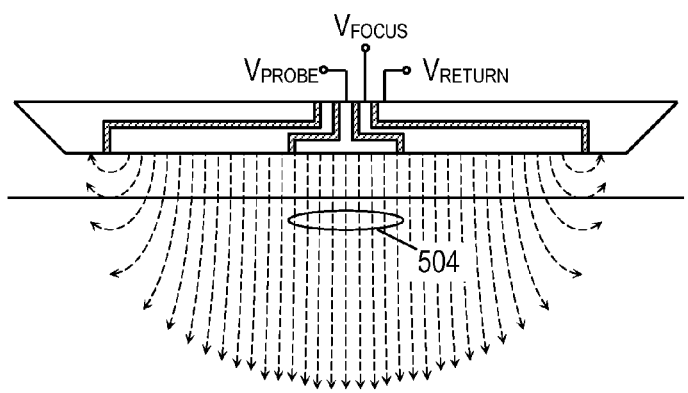
FIG. 5B shows an illustrative current flow field.

FIG. 5B shows an illustrative current flow field that demonstrates the purpose of the focus electrode. The focus electrode isolates the measurement electrode from non-uniformities in the electrical field, causing the electrical field lines 504 emanating from the measurement electrode to pass through the mud gap and enter the formation at right angles to the measurement electrode surface. In other words, the dispersion of current flow caused by the mud gap is strongly limited in the region near the measurement electrode, thereby preventing a loss of resolution. Because the current flow from the measurement electrode 402 is most strongly concentrated in the immediate vicinity of the measurement electrode, the formation resistivity in this region dominates the measurement. The shape of the measurement region is further controlled by locating the return electrode 406 immediately adjacent the focus electrode 404 (as opposed to a remotely-located return such as on the wire line supporting the tool).

Figure 6:
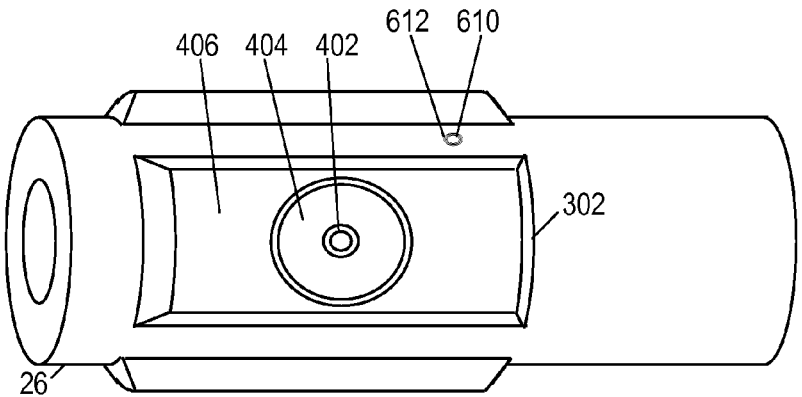
FIG. 6 is a perspective view of a second illustrative logging tool.

FIG. 6 shows an alternative illustrative embodiment of tool 26 in which the measurement electrode 402 has a circular shape about 1 inch in diameter and the focus electrode 404 has a circular shape with an outside diameter of 3 inches. The illustrated embodiment further includes a mud cell comprising a button electrode 610 surrounded by a thin ring electrode 612. The mud cell is intended to measure mud resistivity and capacitance, and hence it is recessed or located between stabilizers to prevent close contact with the borehole wall. In the illustrative embodiment, the button electrode is about 1/8 inch and the ring electrode is about 0.01 inches thick.

Figure 7:
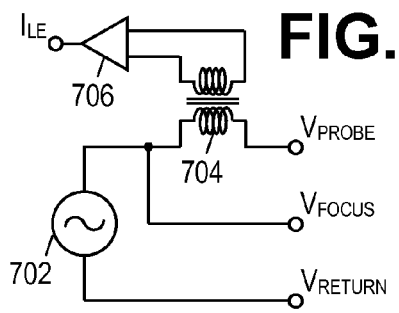
FIG. 7 is a schematic of an illustrative sensing circuit.

Both the formation sensing surface and the mud cell can be driven with similar circuitry. FIG. 7 is a diagram of an illustrative circuit for driving the sensing surface. A power source 702 drives a high frequency voltage between the return electrode and the other electrodes. The contemplated signal frequencies range between 1 MHz and 100 MHz. (Nevertheless, it is recognized that signal frequencies as low as 20 kHz and as high as 200 MHz could be employed with some expectation of success.) The drive signal magnitude is dependent on the sensitivity of the sensing amplifier, but the currently contemplated voltages range from 20 V to 200 V. The connection between the source 702 and the measurement electrode ($V_{PROBE}$) is provided with a current sensing circuit that includes a transformer 704 and a sensing amplifier 706. Transformer 704 converts the current flow from the measurement electrode into a voltage signal that is applied to high impedance inputs of sensing amplifier 706. The voltage at the output of the sensing amplifier is sampled and digitized by a microcontroller to measure the current flow. (In some embodiments, a down-converter is used to reduce the frequency before analog-to-digital conversion is performed. In other embodiments, an envelope and/or phase detector is used to measure amplitude and phase before analog-to-digital conversion.) The apparent formation resistivity $R_A$ can then be determined in accordance with Ohm's law:

$$R_A = kV/I \tag{1}$$

where k is a calibration constant, V is the magnitude of the power source 72, and I is the in-phase magnitude of the current flow from the measurement electrode. The impedance of the sensing circuit formed by transformer 704 and amplifier 706 is kept low so as to keep the voltage relations $V_{PROBE} = V_{FOCUS} = -V_{RETURN}$ as accurate as feasible.

It should be recognized that the apparent formation resistivity given by equation (1) is only a first order approximation, and that more accurate models can be constructed. For example, the thin layer of mud that separates the sensing surface from the borehole wall may be modeled as a series combination of a resistance and a capacitance. This resistance and capacitance can be measured by the mud cell and compensated for as follows. First, the mud cell provides measure of mud resistivity $r_M$ and capacitivity $c_M$:

$$r_M + (1/jwc_M) = k'V'/I' \tag{2}$$

where the prime indicates voltage and current measurements by the mud cell. When the impedance of the thin mud layer is included in the measurements by the sensing surface, we see that $$R_A = kV/I = R_F + R_M = R_F + [r_M d - j(d/wc_M)], \text{ or} \tag{3}$$

$$R_F = R_A - [r_M d + (d/jwc_M)], \tag{4}$$

where d is the standoff (i.e., the thickness of the mud layer). The standoff d can be measured with a different instrument (e.g., an acoustic caliper) or estimated from the imaginary parts of equations (2) and (3):

$$d = Im\{R_A\}/Im\{k'V'/I'\} \tag{5}$$

With a known standoff, the resistance of the mud layer can be calculated and removed from the sensing surface measurement. Other suitable compensation approaches exist and may be employed by the tool.

Figure 8:
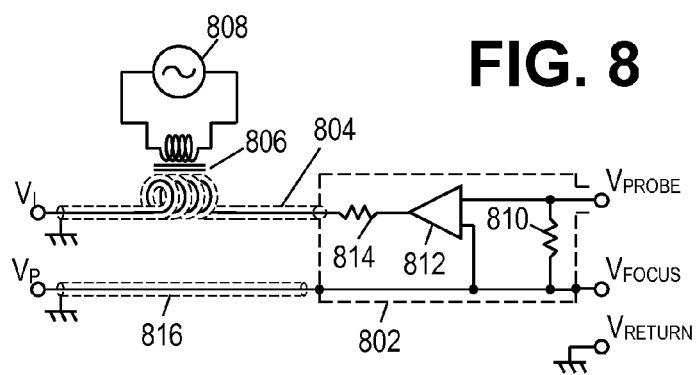
FIG. 8 is a schematic of an illustrative implementation of a formation sensing circuit.

FIG. 8 shows an illustrative implementation of the circuitry for the sensing surface and mud cell, designed to minimize cross-talk between the source and detector circuitry. (It should be recognized that the sensed signal voltages may be nine or ten orders of magnitude smaller than the source signal voltages.) The focus electrode is preferably the front surface of a conductive box 802 that almost entirely encloses detection circuitry that includes a resistance (or impedance) 810, a low noise amplifier (LNA) 812, and an impedance matching resistor 814. The conductive box 802 surrounds (but does not enclose) the measurement electrode (denoted by $V_{PROBE}$ in FIG. 8). The only other breach in the surface of box 802 is to enable control/power and signal wires enclosed within a shield 804 to enter and exit box 802. Shield 804 is designed to attenuate radio frequency interference from transmit source 808.

Transmit source 808 drives a 2 MHz, 20 volt signal to the conductive box 802. Because the focus electrode 404 is part of the conductive box, this signal potential appears on the focus electrode. The conductive box 802 can be driven by a direct electrical connection from source 808, or (as shown in FIG. 8) via a transformer 806 that couples the signal to shield 804, which in turn is electrically connected to box 802. The wires inside the shield 804 do not experience interference from the drive signal flowing on the outer surface of the shield.

The measurement electrode 402 is coupled to the focus electrode 404 via a small impedance 810 (such as a 50 ohm resistor). The LNA 812 senses the voltage drop resulting from current flow through impedance 810, and drives the amplified voltage through an impedance matching resistor 814 to a signal line passing through shield 804. Thus the voltage at node $V_I$ represents a measure of current flowing from the measurement electrode 402. A second signal line, passing through a grounded shield 816, is coupled to the conductive box 802 to provide a measure of the focus electrode voltage $V_P$ (which will be almost exactly equal to the measurement electrode voltage). These measurements can be demodulated and coupled to an analog-to-digital converter that captures the in-phase and quadrature-phase components to enable resistivity measurements as described above in equations (1)-(5).

When the formation resistivity measurements are associated with tool position L and azimuthal orientation β, they form a resistivity image 902 such as that shown in FIG. 9. The surface of the borehole wall is divided into "bins", with each bin representing a pair of tool position L and azimuthal orientation β values. Each time the sensing surface passes a bin, it gathers one or more measurements that can be combined with previous measurements for that bin. The combined measurements can then be processed in accordance with equation (1) to obtain a resistivity estimate that can be displayed as a pixel color and/or a pixel intensity. Such an image often reveals bedding structures (such as structures 904) and fractures (such as fracture 906). Such features often exhibit a sinusoidal dependence on azimuthal angle, indicating that the borehole encountered the feature at an angle other than 90 degrees. We note here that such features are usually apparent even if the resistivity measurements are only relative in nature rather than precisely accurate.

The image resolution is largely determined by the measurement resolution of the sensing surface. The measurement resolution depends not only on the size of the measurement electrode, but also on the standoff between the borehole wall and the sensing surface, and to some extent upon the formation resistivity. For moderately resistive formations having moderate resistivity contrasts (i.e., formations having resistivities of 10 Ωm or better, with boundaries between formations having a resistivity that is a factor of 10 smaller or larger), the measurement resolution essentially equals the size of the measurement electrode. This resolution is expected to degrade slightly (e.g., from a one-inch axial resolution to a perhaps a five-inch axial resolution) at low resistivities or low contrasts (i.e., formations having resistivities of 2 Ωm or less, or formations with boundaries to formations having a resistivity that is a factor of 2 smaller or larger).

Figure 10A:
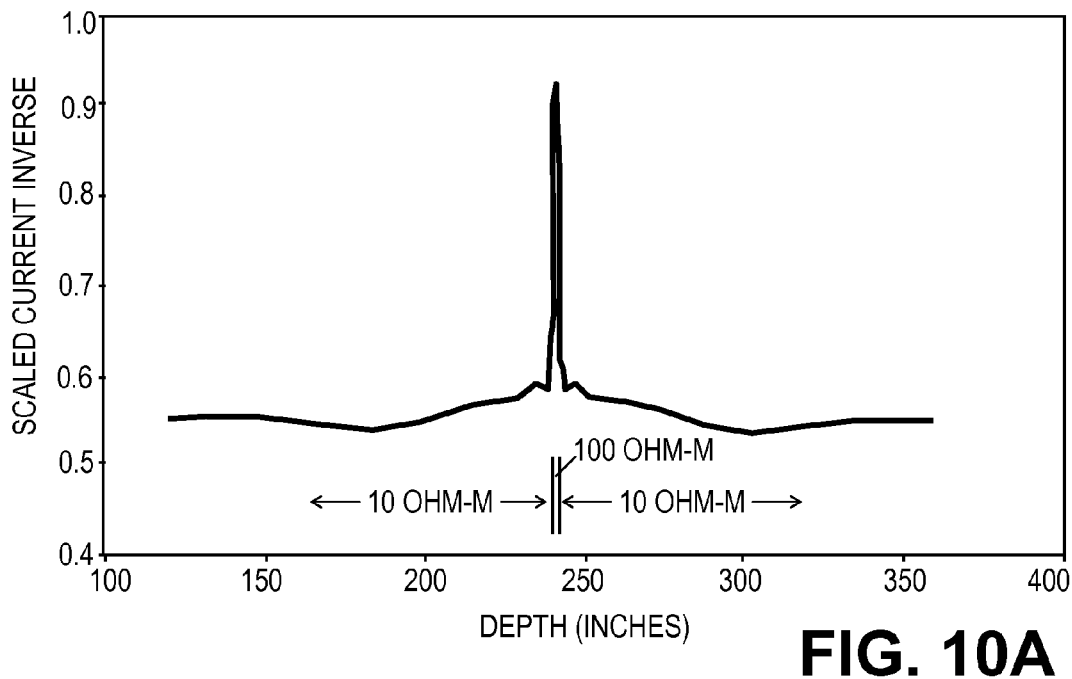
FIGS. 10A-10B show graphs of the simulated tool response.
Figure 10B:
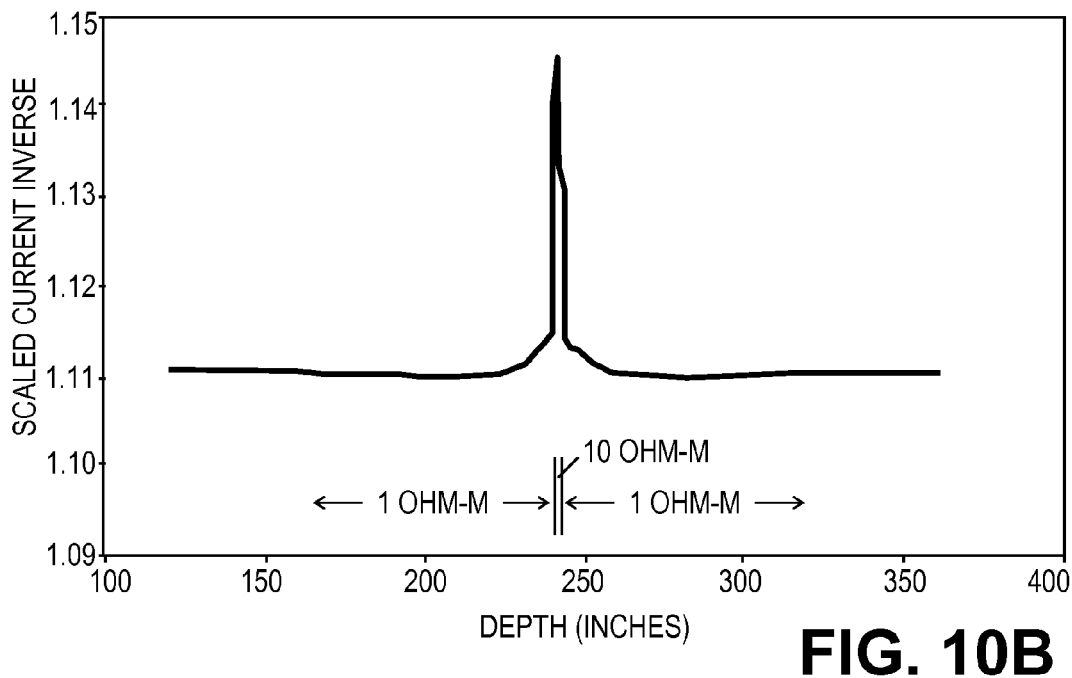

The axial resolution is demonstrated by the modeled responses shown in FIGS. 10A and 10B. In FIG. 10A, scaled inverse current measurements are shown as a function of depth, assuming a 0.2 foot (6 cm) bed having a resistivity of 100 Ωm sandwiched between two thick beds having a resistivity of 10 Ωm. The model assumes a 2-inch (5 cm) standoff, with a borehole fluid resistivity of $10^6$ Ωm. The model employs a 1 MHz signal frequency. The model for FIG. 10B has the same assumptions, but with a 20 MHz signal frequency and with the formation resistivities reduced to 10 Ωm and 1 Ωm for the thin and thick beds respectively. In both responses, a peak of the appropriate width is clearly visible, though the magnitude has decreased from over 160% to only 103% of the baseline. Nonlinear compensation is expected to be desirable. Noise enhancement is not expected to be a problem due the noise reduction available from the high measurement repetition rate. Moreover, it is expected that measurements at multiple frequencies may be combined to measure and compensate for the effects of standoff variation.

FIG. 11 shows a flow diagram of an illustrative resistivity imaging method. In block 1002, the resistivity imaging tool is placed in a borehole. For LWD, the tool is part of the bottom hole assembly and is used to perform logging as drilling operations are performed. For wireline logging, the tool is part of a sonde that is lowered to the bottom of the region of interest to perform logging as the logging tool is pulled uphole at a steady rate. If needed, the sensing surfaces are deployed. For example, if the sensing surfaces are mounted on pads, those pads may be extended to contact the borehole wall.

Blocks 1004-1016 represent operations that occur during the logging process. Though shown and described in a sequential fashion, the various operations may occur concurrently or in a different sequence. In block 1004, the tool controller measures the tool orientation and position. Such measurements can be acquired as described earlier, i.e., using an orientation and positioning package in the bottom hole assembly. Alternatively, the tool controller supplies the resistivity measurements to another module that associates the measurements with the appropriate tool position and orientation. In block 1006, the tool controller drives a voltage between the measurement electrode and the return electrode while measuring the current flow. In some alternative embodiments, the tool drives a current between the measurement electrode and the return electrode (while perhaps employing a voltage follower circuit to maintain the focus electrode at the same potential as the measurement electrode), and measures the voltage. Either measurement can be repeated in block 1008 at a different signal frequency.

In block 1010, the formation resistivity is estimated. This estimate can be performed using equation (1). Some tool embodiments will average together multiple measurements before estimating the resistivity. Other equations can also be used, including equations for equivalent circuit models that take into account the variable impedance of the fluid gap resulting from standoff variation and other causes. If desired, measurements may be made at more than two frequencies to account for additional parameters in the equivalent circuit model. In some embodiments, the measurement signal includes energy at multiple frequencies to enable simultaneous measurement of the response for each such frequency. Such signals can be made from a sum of sinusoidal signal of different frequencies (i.e., a combination of narrowband signals), or from a wideband signal such as white noise or a signal that resembles an impulse in the time domain. In some tool embodiments, the signal frequency may be switchable between low frequencies (e.g., around 1 MHz) and high frequency regions (e.g., around 40 MHz) for measurements in formations of differing resistivity. Higher frequencies may be preferred for formations having a generally lower resistivity, and vice versa.

In block 1012, a surface facility receives telemetry data specifying the latest resistivity measurements with their associated tool positions and orientations. The surface facility may take the form of a computer in a wireline truck or mounted on a logging skid to collect data from telemetry receivers. The computer collects and processes the data in accordance with its installed software to map the resistivity measurements into borehole wall image pixels and form a resistivity image of the borehole wall. The image is displayed and updated as the data is collected. In some systems, the driller views the image and other available logging data and uses the data to steer the drill string into productive formations. In other systems, completions engineers analyze the image and other available logging data to construct a completion plan, including perforation regions, isolation packers, and controlled flow paths.

In block 1014, the tool continues to move into new positions and orientations. In block 1016, the tool controller determines whether logging is complete. Such a determination may be based on tool position, available memory, a logging command, or other configurable strategies. If logging continues, the tool controller returns to block 1004. In some embodiments, the tool controller shuts down when logging is complete, while in other embodiments, the tool controller continues to monitor tool position or other parameters for a condition that indicates logging should resume.

While illustrative embodiments of this invention have been shown and described, modifications thereof can be made by one skilled in the art without departing from the spirit or teaching of this invention. The embodiments described herein are illustrative and are not limiting. Many variations and modifications of the system and apparatus are possible and are within the scope of the invention. For example, though the disclosure and claims use the term "resistivity", it is widely recognized that conductivity (the inverse of resistivity) has a one-to-one correspondence with resistivity and, consequently, usually serves as a functional equivalent to resistivity. Accordingly, the scope of protection is not limited to the embodiments described herein, but is only limited by the claims which follow, the scope of which shall include all equivalents of the subject matter of the claims.

What is claimed is:

1. A resistivity imaging tool that comprises:
   at least one sensing surface positioned on a face of a stabilizer on a logging-while-drilling tool body, wherein the sensing surface comprises:
   a measurement electrode;
   a focus electrode surrounding the measurement electrode; and
   a return electrode surrounding the focus electrode.

2. The tool of claim 1, wherein the sensing surface includes a non-conducting region between the measurement electrode and the focus electrode, and a non-conducting region between the focus electrode and the return electrode, and wherein the non-conducting regions each have a width of no more than 0.2 inches.

3. The tool of claim 1, wherein the return electrode is an integral portion of the logging tool body.

4. The tool of claim 1, wherein the return electrode is electrically connected to the logging tool body.

5. The tool of claim 1, wherein the focus electrode has a voltage approximately equal to the measurement electrode.

6. The tool of claim 5, further comprising:
   a power source coupled between the measurement electrode and the return electrode to supply a measurement signal; and
   a sense circuit coupled to the measurement electrode to measure an electrical parameter indicative of formation resistivity.

7. The tool of claim 6, wherein the power source is a voltage source and the electrical parameter is current flow.

8. The tool of claim 6, wherein the power source provides a sinusoidal signal having a frequency in the range between about 1 MHz and 100 MHz, inclusive.

9. The tool of claim 6, further comprising a processor that receives formation resistivity measurements based at least in part on the electrical parameter and forms a resistivity image for display to a user by mapping those measurements to image pixels based on tool position and orientation measurements associated with the resistivity measurements.

10. The tool of claim 1, wherein the measurement electrode has a dimension parallel to the tool axis, said dimension being between 0.25 inches and 4 inches, inclusive.

11. The tool of claim 10, wherein the focus electrode has an outer dimension parallel to the tool axis, said outer dimension being at least twice the axial dimension of the measurement electrode.

12. The tool of claim 11, wherein the return electrode has an inner dimension parallel to the tool axis, said inner dimension being no more than 25-times the axial dimension of the measurement electrode.

13. The tool of claim 1, wherein the tool body has at least two stabilizers, and wherein the at least one sensing surface is a wall-contacting surface of one stabilizer.

14. A resistivity imaging method that comprises:
   driving a voltage signal between a measurement electrode and a return electrode in a sensing surface positioned on a face of a stabilizer of a logging-while-drilling tool, the stabilizer located near a wall of a borehole containing an oil-based mud, the sensing surface further including a focus electrode, the measurement electrode being surrounded by the focus electrode and the focus electrode being surrounded by the return electrode;
   measuring a current flow associated with the measurement electrode;
   determining a tool position and orientation; and
   estimating a borehole wall resistivity associated with the tool position and orientation.

15. The method of claim 14, further comprising:
   displaying a borehole wall image representing resistivity as a function of depth and azimuthal angle.

16. The method of claim 14, wherein the focus electrode is maintained at approximately the same potential as the measurement electrode.

17. The method of claim 14, wherein the voltage signal provides multiple frequencies in a time-multiplexed fashion.

18. The method of claim 14, wherein the current flow is detected for different signal frequencies.

19. A logging system that comprises:
   a logging-while-drilling tool having a sensing surface positioned on a face of a stabilizer that enables resistivity measurements of a wall in a borehole containing a low-conductivity fluid, wherein the sensing surface comprises:
   a measurement electrode;
   a focus electrode surrounding the measurement electrode; and
   a return electrode surrounding the focus electrode;
   a processor that receives values indicative of resistivity measurements and maps them to pixels to form a borehole wall image for display.

20. The system of claim 19, wherein the logging tool further comprises:

a voltage source coupled between the measurement electrode and the return electrode; and a current sensor that detects current flow from the measurement electrode.

21. The system of claim 20, wherein the tool combines current flow measurements associated with different signal frequencies to measure resistivity.

22. The system of claim 21, wherein the return electrode has an inside dimension of less than 24 inches as measured parallel to a longitudinal axis of the logging tool.

23. The system of claim 19, further comprising a mud cell, wherein the processor receives measurements of mud impedance from the mud cell and estimates tool standoff based at least in part on the mud impedance measurements.

* * * * *